United States Patent
Iraschko (10) Patent No.: US 8,684,146 B2
(45) Date of Patent: Apr. 1, 2014

(54) DISC BRAKE ADJUSTING DEVICE WITH A TORQUE DEPENDENT COUPLING

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 97 days.

(21) Appl. No.: 13/015,930

(22) Filed: Jan. 28, 2011

(65) Prior Publication Data

US 2011/0155518 A1    Jun. 30, 2011

Related U.S. Application Data

(63) Continuation of application No. PCT/EP2009/005560, filed on Jul. 31, 2009.

(30) Foreign Application Priority Data

Aug. 1, 2008  (DE) .......................... 10 2008 036 034

(51) Int. Cl.
*F16D 65/56* (2006.01)

(52) U.S. Cl.
USPC ........................................................ 188/71.9

(58) Field of Classification Search
USPC ........................ 188/71.7–71.8, 71.9
See application file for complete search history.

(56) References Cited

U.S. PATENT DOCUMENTS

| | | | |
|---|---|---|---|
| 3,550,732 A * | 12/1970 | Beller | 188/196 D |
| 4,180,146 A * | 12/1979 | Airheart | 188/71.8 |
| 4,491,203 A | 1/1985 | Monick | |
| 5,353,896 A | 10/1994 | Baumgartner et al. | |
| 5,630,490 A * | 5/1997 | Hudson et al. | 192/223.3 |
| 7,694,784 B2 * | 4/2010 | Iraschko | 188/196 D |
| 7,926,626 B2 * | 4/2011 | Iraschko | 188/72.7 |
| 2007/0209890 A1 | 9/2007 | Iraschko | |

FOREIGN PATENT DOCUMENTS

| | | |
|---|---|---|
| DE | 40 34 185 A1 | 12/1991 |
| DE | 10 2004 037 771 A1 | 3/2006 |
| GB | 2332027 A * | 6/1999 |
| JP | 54-126873 A | 10/1979 |

(Continued)

OTHER PUBLICATIONS

Japanese Office Action with English translation dated Sep. 24, 2013 (four (4) pages.

(Continued)

*Primary Examiner* — Anna Momper
(74) *Attorney, Agent, or Firm* — Crowell & Moring LLP (57) ABSTRACT

A wear adjustor adjusts the wear of brake pads and a brake disc of a pneumatic disc brake having a rotary-lever-actuated brake application device. The adjustor is insertable into an adjusting spindle and attached to a caliper of the disc brake by way of a mounting disc. An axial bearing is formed axially on one side of a drive ring and a ball ramp coupling with a freewheel function is formed axially on the opposite side of the drive ring. The ball ramp coupling has balls, has the drive ring arranged at the drive-input side axially between the axial bearing and the balls thereof, and has a drive-output-side clutch ring. A cone clutch is arranged between the drive-output-side clutch ring and a spring sleeve for a cylindrical spring. A torque-dependent coupling with positive restraint is arranged axially between the cone clutch and the spring sleeve.

10 Claims, 5 Drawing Sheets

(56) References Cited

FOREIGN PATENT DOCUMENTS

| | | |
|---|---|---|
| JP | 63-4276 U | 1/1988 |
| JP | 5-509146 A | 12/1993 |
| JP | 2008-508490 A | 3/2008 |
| WO | WO 2006015782 A1 * | 2/2006 |
| WO | WO 2006099938 A1 * | 9/2006 |

OTHER PUBLICATIONS

Corresponding International Search Report dated Oct. 29, 2009 with English translation (Four (4) pages).

* cited by examiner

DISC BRAKE ADJUSTING DEVICE WITH A TORQUE DEPENDENT COUPLING

CROSS-REFERENCE TO RELATED APPLICATIONS

This application is a continuation of PCT International Application No. PCT/EP2009/005560, filed Jul. 31, 2009, which claims priority under 35 U.S.C. §119 from German Patent Application No. DE 10 2008 036 034.1, filed Aug. 1, 2008, the entire disclosures of which are herein expressly incorporated by reference.

This application contains subject matter related to U.S. application Ser. No. 13/015,974, 13/015,954, 13/016,418, and 13/016,078, entitled "A Disc Brake Adjusting Device Having an Output Side Coupling Ring with a Defined Working Rotational Axis," "A Disc Brake Adjusting Device Having a Cone Clutch Utilizing Clamping Balls," "Method for Fixing an Adjustment Device on a Disc Brake", and "A Disc Brake Adjustment Device Having a Blocking Device" filed on even date herewith.

BACKGROUND AND SUMMARY OF THE INVENTION

The invention relates to an adjusting device for a disc brake and, more particularly, an adjusting device for a pneumatically actuated disc brake with a rotary lever-actuated brake application device, which adjusting device can preferably be inserted in an adjusting spindle of the brake application device and can be attached to a brake caliper of the disc brake by way of a mounting disc.

Adjusting devices or wear adjustors for disc brakes are available in different designs. From DE 10 2004 037 771 A1 (having U.S. published counterpart application US2009/209890A1) an adjusting device for a disc brake is known, the specifications of which are expressly incorporated by reference herein. This adjusting device is suitable for a pneumatically actuated disc brake, more preferably in one having floating or sliding caliper design. However, it can also be utilized in pneumatically actuated fixed or pivoting caliper disc brakes.

Pneumatically actuated disc brakes have over time become standard equipment on heavy commercial vehicles. Such disc brakes require a mechanical boosting or "force amplification" for generating the required clamping force since the force of pneumatically actuated brake cylinders is limited because of the pressure level (currently approximately 10 bar) and the limited size of the brake cylinders. The currently known pneumatically actuated disc brakes have amplification ratios between 10:1 and 20:1. The piston strokes of the brake cylinders range from 50 to 75 mm, which produces clamping travel for pressing the brake pads against the brake disc of approximately 4 mm.

The friction material thickness of the brake pads is in the range of 20 mm, since two pads are installed, a wear travel of approximately 40 mm thus being obtained without consideration of the disc wear. This travel is a multiple greater than the above-mentioned clamping travel. It is therefore necessary to adjust the brake by means of a device in accordance with the pad wear. The state of the art is an automatically operating wear adjustment, by which it is achieved that the so-called lift clearance, meaning the air gap between the brake pads and the brake disc in the unactuated stated, is kept constant independently of the wear state and wear characteristic of the brake pads.

Frequently, disc brakes having a wear adjustor that is arranged concentrically in the hollow space of a threaded spindle or ram and eccentrically driven by a rotary brake lever via a drive element (e.g., shifting finger) are very frequently found in commercial vehicles. During a braking operation, the brake lever coupled with the piston rod of the brake cylinder performs a rotary movement. Before the rotary movement of the lever is introduced into the wear adjustor via the coupling mechanism of the adjustment (e.g.: shifting fork and shifting finger or gears), a so-called idle travel has to be overcome. This travel is decisive for the size of the lift clearance since during this movement the adjustment is not activated and the clamping travel thus constitutes the lift clearance. Once this idle travel has been overcome, the adjustor is put into a rotary motion and an adjusting operation is initiated through the coupling to the threaded spindle or tube.

Figure 5:
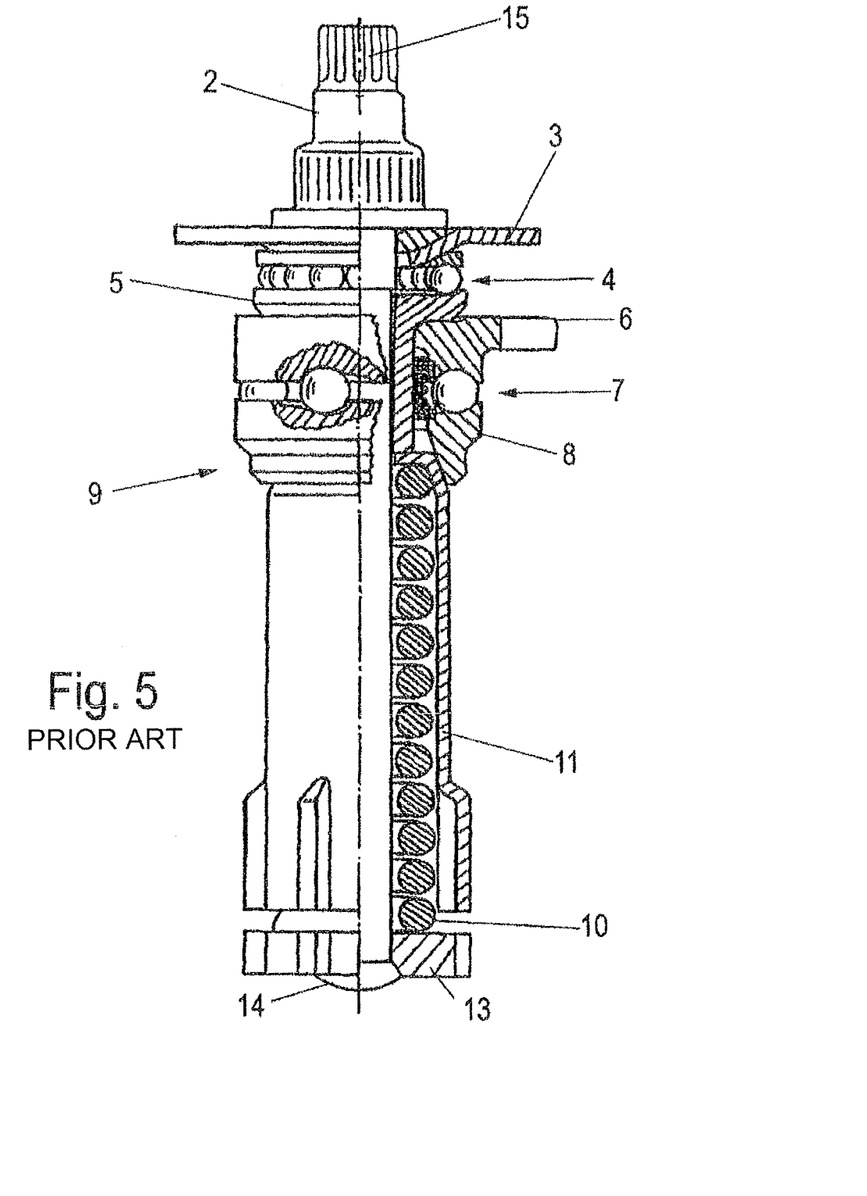
FIG. 5 is a part-sectional view of an adjusting device as in the prior art.

DE 10 2004 037 771 A1 describes such an adjusting device, which is shown in FIG. 5. It substantially consists of the following function elements: shaft 2; mounting disc 3; axial bearing 4; collar bush 5; shifting fork, or drive ring 6; ball ramp clutch 7; clutch ring 8; cone clutch 9; and cylindrical spring 10. With respect to the description, reference is made to DE 10 2004 037 771 A1.

Essentially, the wear adjusting device has to fulfil two functions:

1. the automatic lift clearance setting (normal operation); and
2. the manual resetting of the adjusting mechanism when replacing the brake pads.

When installing new brake pads, the thrust pieces, which press the brake pads against the brake disc, have to be retracted. This is carried out by turning back threaded spindles (threaded tubes), which during the use of the brake were turned out through the automatically operating wear adjustor in accordance with the brake pad wear.

During this turning back, the adjusting device is manually turned back with a spanner from the so-called wear position into the starting position. When doing so, the adjusting device has to be turned against the locking direction of a freewheel. However, since the freewheel has a 100% locking action, turning back is not easily possible.

This and other objects are achieved by an adjusting device for adjusting the wear of brake pads and a brake disc of a pneumatically actuated disc brake with a rotary lever-actuated brake application device. The wear adjustor preferably can be inserted in an adjusting spindle of the brake application device and attached to a brake caliper of the disc brake by way of a mounting disc. Axially on a side of a drive ring, an axial bearing, and axially on the opposite side of the drive ring, a ball ramp coupling with freewheel function is formed. The ball ramp coupling comprises balls, a drive bush arranged axially between the axial bearing and its balls on the drive end and a clutch ring on the output side. A cone clutch is arranged between the clutch ring on the output side and a spring sleeve for a cylindrical spring. Axially between the cone clutch and the spring sleeve, a torque-dependent coupling with positive restraint is arranged.

Because of this it is possible that installation space and interface targets are taken into account and largely maintained, as a result of which a simple replacement is possible. The torque-dependent coupling with positive restraint additionally offers a typical noise upon manual resetting as an acoustic feature, which in a simple manner already known to the user signals to an actuating person a certain state as a result of which a training process is simplified.

In that the cone clutch preferably is a ball cone clutch which comprises the drive-end clutch ring and a cone bush interacting with the torque-dependent coupling, wherein between the output-side clutch ring and the cone bush, cone balls are arranged, it is possible to achieve a compact design. More particularly, since the torque-dependent coupling is formed as a ratchet coupling from a portion of the cone bush of the cone clutch and a coupling disc. The positive restraints are formed from corresponding toothings in each case. The coupling disc is connected to the spring sleeve.

This design offers the following advantages:

(a) the known, typical noise occurs upon manual turning-back;

(b) by retaining a locking function of the freewheel in the rest position, an improved shake-proof feature against turning-open of the adjusting mechanism is obtained;

(c) cost-effective manufacture of the components is achievable through non-cutting forming.

In a preferred embodiment, the corresponding toothings are embodied on the portion of the cone clutch and on the coupling disc as opposing spur toothings. Such components can be cost-effectively produced through non-cutting forming.

Turning back or retraction of the adjusting device is carried out against the locking direction of the freewheel. The torque-dependent coupling through matching of the spur toothings makes possible that the toothings "over-ratchet" when a certain torque is exceeded. The preload of this coupling is performed via the cylindrical spring already present in the adjusting device, which cylindrical spring is preferably adjustable. The torque-dependent coupling is designed for a higher transmission moment than the ball ramp coupling. If the ratchet coupling were to respond before the ball ramp coupling, which can also be called a load shift coupling, major wear of the ratchet coupling would occur because of the high stress cycle numbers involved.

With this adjusting device, a directional coupling acting in the axial direction is installed. The directional coupling is formed of a ball ramp system and a friction coupling, more preferably the ball cone clutch.

Upon manual turning back, the rotary movement is initially introduced into the torque-dependent ratchet coupling and into the ball cone clutch via the shaft and the spring sleeve. From there, the torque is directed into the ball ramp coupling via the friction connection in the ball cone coupling. Since ball cone and ball ramp coupling are matched for retention by friction, a clamping effect occurs.

The clutch ring and the drive ring which are connected to the shifting fork or form a portion thereof, are each provided with an inner profiling with the help of which it is possible to prevent the two components in the rest position from turning back further. Support for the drive ring and the clutch ring is effected on a collar bush mounted in a rotationally fixed manner, which includes an outer profiling matching the inner profiling of the clutch ring and of the drive ring. When the introduced torque exceeds the response moment of the ratchet coupling, "ratcheting-through" of the ratchet coupling occurs. With stops of the outer profile on the inner profile of the drive ring and the clutch ring, it is achieved that on the one hand the clamping action of the freewheel is retained and on the other hand no rotation in the ball ramp coupling occurs. Otherwise the ratchet coupling would not respond immediately but the ball ramp coupling could be initially rotated until reaching an end position of the balls on the ramp tracks (torque of the ball ramp coupling<torque of the ratchet coupling).

In addition, it is provided that when positioning the stops of the inner profiles of the drive ring and the clutch ring, the stop of the outer profile of the collar bush with the inner profile of the drive ring becomes effective slightly earlier than the stop with the inner profile of the clutch ring. This is effected in that between the outer profile and the inner profiles an angular clearance for the advance of a stop between outer profile and drive ring inner profile before a stop between outer profile and clutch ring inner profile is formed.

It is furthermore preferred that the other end of the collar bush, which forms the fixed portion of the axial bearing, is fastened in a rotationally fixed manner to the mounting disc attached to the brake caliper.

The axial bearing is formed by the one side of the drive ring, rolling elements and a collar of a collar bush, which extends axially through the ball ramp coupling. This likewise reduces the number of components, and allows for a compact construction to be achieved.

A disc brake, more preferably a pneumatically actuated disc brake includes such an adjusting device.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same or similar functions are provided with the same reference characters in the figures.

Figure 6:
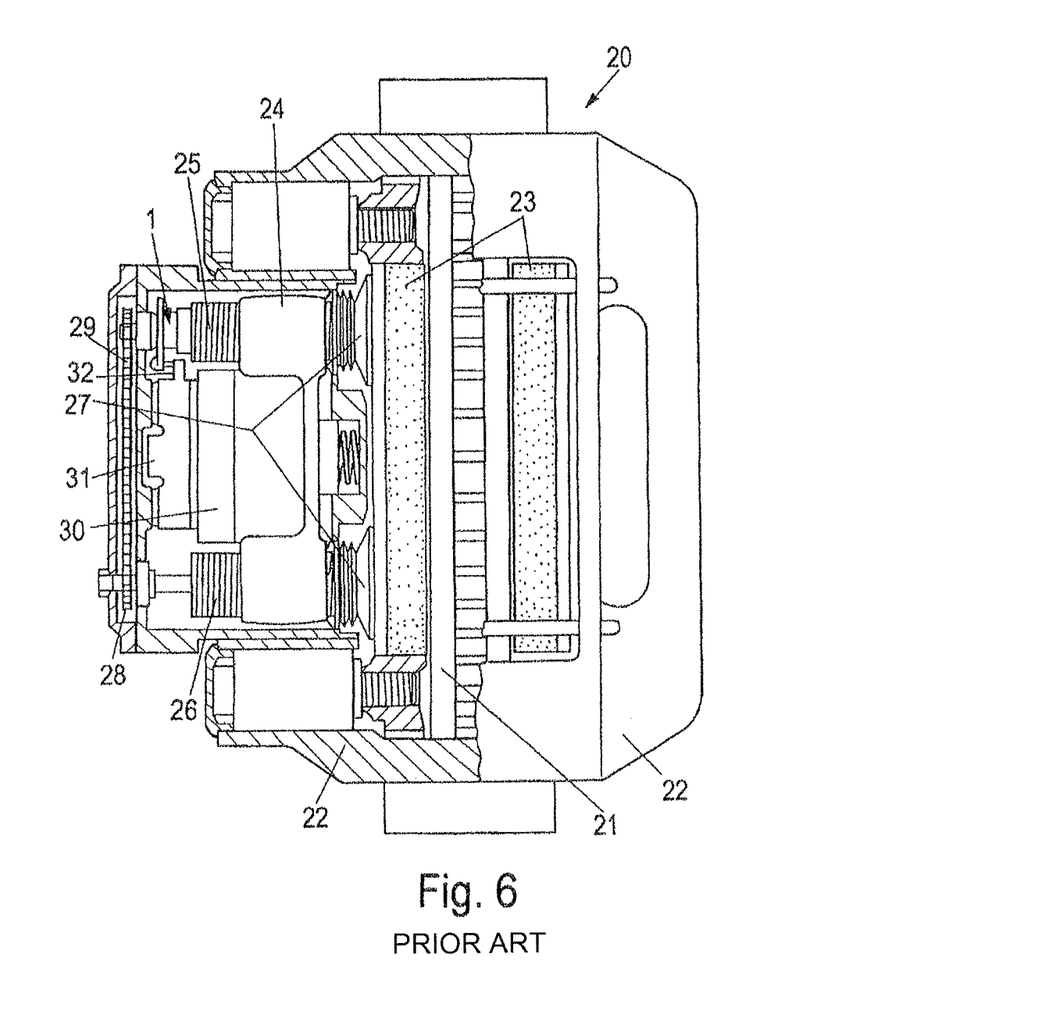
FIG. 6 is a schematic view of a disc brake.

With respect to the construction and function of a pneumatic disc brake as shown in FIG. 6, reference is made to the corresponding description of DE 197 29 024 C1, the specification of which is expressly incorporated by reference herein. In FIG. 6, the following components are identified: disc brake 20, brake disc 21, brake caliper 22, brake pads 23, crossbeam (also known as a "bridge" or "traverse member") 24, adjusting spindles 25 and 26, thrust pieces 27, sprockets 28, chain 29, eccentric 30 and rotary lever 31 carrying a drive element 32 which interacts with a shifting fork of an adjusting device 1. The adjusting device 1 in this case is arranged in the adjusting spindle 25. Such an adjusting device 1 is now explained in more detail. The adjusting device 1 would also be suitable for a disc brake operated by an electric motor. To this end, reference is made to FIGS. 1 and 2.

Figure 1:
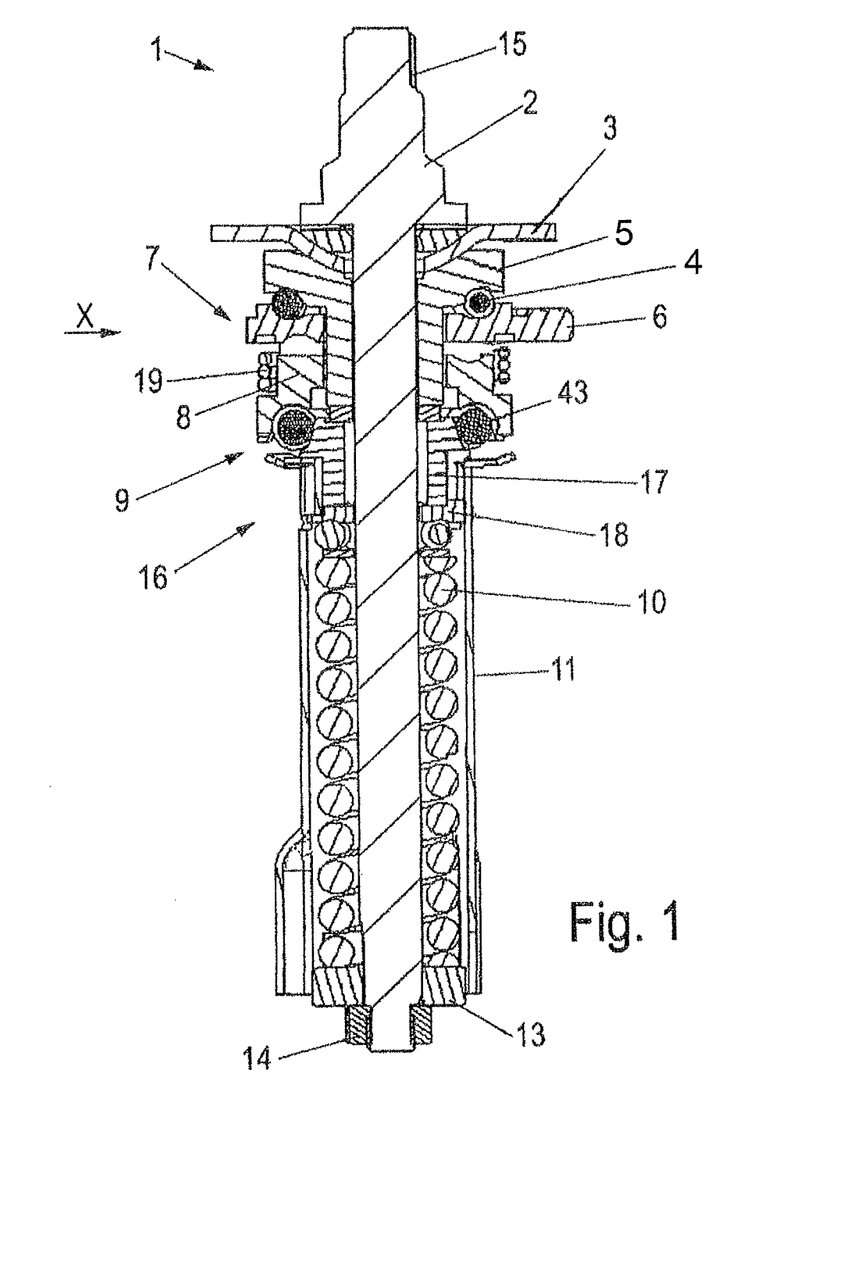
FIG. 1 is a longitudinal section view of an exemplary embodiment of an adjusting device according to the present invention.
Figures 2, 3:
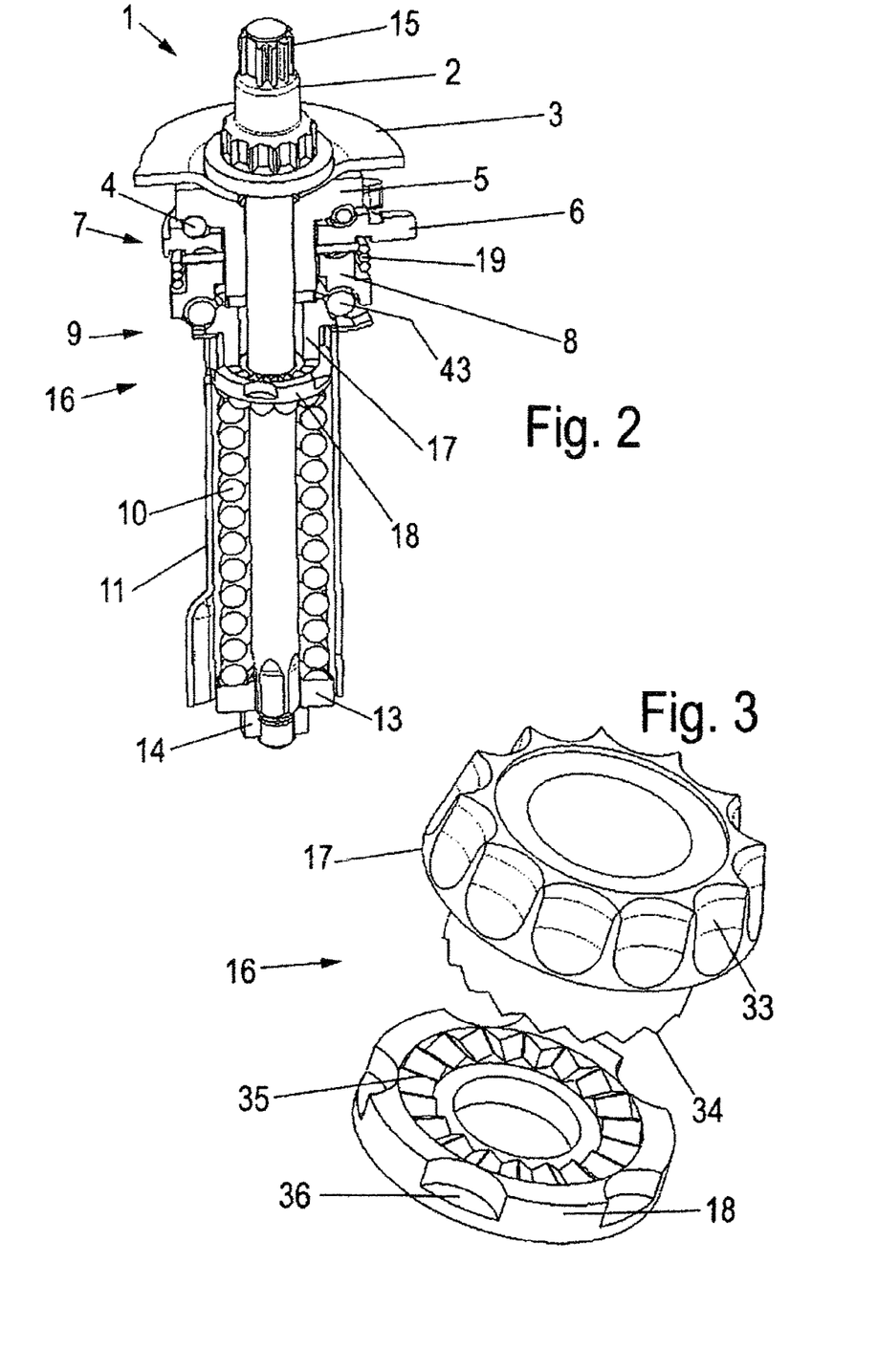
FIG. 2 is a perspective sectional view of the exemplary embodiment of FIG. 1.
FIG. 3 is an enlarged perspective view of a ratchet coupling in FIGS. 1 and 2.

FIG. 1 is a longitudinal sectional representation of an exemplary embodiment of an adjusting device 1 according the invention and FIG. 2 shows a perspective sectional representation of the exemplary embodiment as shown in FIG. 1.

The adjusting device 1 includes the following: a shaft 2 with a drive end 15 at its upper end; a mounting disc 3 for fastening the adjusting device 1 in the brake caliper 22 (see FIG. 6); a collar bush 5, which is attached to the mounting disc 3 in a rotation-proof manner and has an upper collar with a running surface for balls of an axial bearing 4 arranged below; a drive ring 6, which is connected to a shifting fork, which is coupled to the drive element 32 (see FIG. 6) of the rotary lever 31; a ball ramp coupling 7, with a clutch ring 8, which interacts with a cone bush 17, which is connected to a spring sleeve 11 in a rotationally fixed manner via a torque-dependent coupling 16 with positive restraint; a cylindrical spring 10 which is arranged in the spring sleeve 11 and supports itself on a profile disc 13; and an adjusting element 14, for example a nut, which is arranged on the lower end of the shaft 2 and serves for tensioning the cylindrical spring 10 and for the axial cohesion of the elements of the adjusting device 1.

With this adjusting device 1, a directional coupling (freewheel) acting in the axial direction is installed. The directional coupling is formed of a ball ramp coupling 7 and a friction clutch or cone clutch 9, more preferably a ball cone clutch.

The ball ramp coupling 7 consists of the drive ring 6, ramp balls 42 or rolling elements and the clutch ring 8, wherein the clutch ring 8 comprises an upper portion for receiving the balls and a lower portion forming a part of the cone coupling 9. The general function of the adjusting device 1 is extensively described in DE 10 2004 037 771 A1 with reference to FIG. 5, to which reference is made here.

A first difference to the known adjusting device of FIG. 5 is formed by a torque-dependent coupling 16 with positive restraint, which is also designed as a so-called ratchet coupling (designated as such in the following), and which is still explained in more detail below. This ratchet coupling 16 interacts with a portion of the cone bush 17 and is connected to the spring sleeve 11 with a coupling disc 18 in a rotationally fixed manner.

As a further difference to the adjusting device of the prior art, the axial bearing 4, with the exemplary adjusting device 1 according to the present invention, is formed of the collar of the collar bush 5, a side of the drive ring 6 and rolling elements. The lower end of the collar bush 5 extending through the ball ramp coupling 7 forms an axial stop for the cone bush 17 directly or via a thrust washer. The cone bush 17 is pressed upwards by the cylindrical spring 10 via the ratchet coupling 16, wherein the ratchet coupling 16, cone clutch 9, ball ramp coupling 7, and axial bearing 4 components are axially held together and compressed. The collar bush 5 with its stop serves to maintain a minimum play of the bearings. In addition, a compression spring 19 is arranged between the clutch ring 8 and the drive ring 6. The cone bush 17 can continue to support itself via its upper end via the thrust washer (shown here) on the lower end of the collar bush 5 (will still be explained in more detail below).

FIG. 3 illustrates an enlarged perspective representation of the ratchet coupling 16 as shown in FIGS. 1 and 2. The ratchet coupling 16 consists of a lower section of the cone bush 17 with a first spur toothing 34 and a coupling disc 18 with a corresponding second spur toothing 35 located opposite the first spur toothing 34. In addition, the coupling disc 18 has recesses 36 for coupling to the spring sleeve 11, which is not explained in more detail.

The portion of the cone bush 17 of the cone clutch 9 located at the top in FIG. 3 is provided with pockets 33 for interaction with the cone balls 43 in a manner not described in more detail.

Upon the so-called normal operation, a rotary movement is introduced into the shifting fork and the drive ring 6 of the adjusting device through the brake or rotary lever 31 (see FIG. 6). By way of the ball ramp coupling 7 (between shifting fork 6 and clutch ring 8) the rotary movement is directed into the ball cone clutch 9. Because of the matching of ball ramp coupling 7 and ball cone clutch 9, retention by friction and thus passing-on of the torque into the ratchet coupling 16 connected downstream occurs. From the ratchet coupling 16, the torque is finally directed into the spring sleeve 11 and from there via a longitudinal toothing into the threaded tube or the adjusting spindles 25, 26 (see FIG. 6).

In normal operation, there are two different operating states.

(1) Operating state BZ1: the lift clearance (gap between brake pad 23 and brake disc 21) is too large, an automatic adjustment is carried out. When doing so, the required adjusting moment of the non-clamped adjusting spindle 25, 26 is smaller than the load shifting moment of the ball ramp coupling 7. The adjusting spindle 25, 26 is thus rotated during the forceless actuation phase.

(2) Operating state BZ2: the brake pads 23 contact the brake disc 21 and the adjusting spindles 25, 26 are clamped. Because of deformation in the brake and the brake pads 23, the brake lever continues to perform a rotary movement until an equilibrium of forces is reached. Consequently, a rotary movement continues to be introduced into the shifting fork or the drive ring 6 of the adjusting device 1. Since the adjusting spindles 25, 26 in this phase are clamped in a quasi rotationally fixed manner, only the so-called load shift coupling or ball ramp coupling 7 reacts now. During this, a relative movement occurs between shifting fork 6 and coupling ring 8. Through the rolling of the ramp balls 42 on the ball ramps 41 (see FIG. 4) of the shifting fork 6 and of the clutch ring 8, the clutch ring 8 is pushed away in the axial direction against the force of the cylindrical spring 10. The clutch ring 8 transmits the force to the ratchet coupling 16 via the ball cone clutch 9. Since the response moment of the ratchet coupling 16 is greater than the load shift moment of the ball ramp coupling 7, no movement and no wear loading occur in the ratchet coupling 16.

On releasing the brake, the movement reversal occurs in the adjusting device 1. When this happens, the ramp balls 42 initially roll back again down the ball ramps 41 as far as the original position. On reaching the original ball position the cylindrical spring 10 no longer supports itself via the ball ramp coupling 7, but via a stop on the collar bush 5. The ball cone clutch 9 and the ball ramp coupling 7 are thus practically free of forces. If upon actuation of the brake an adjustment has taken place, the ball cone clutch 9 is now rotated within itself (freewheel function) through the shifting fork 6 turning back. The adjusting spindle 25, 26 thus remains in the previously adjusted position.

The shaft 2 at its upper end in FIGS. 1 and 2 has a drive end 15, which for a corresponding spanner for example has a hexagonal profiling. With a tool, for example an offset ring spanner, applied to the hexagonal profiling, the shaft 2 is now rotated in the counter-clockwise direction. During this manual resetting, the torque is initially introduced into the ratchet coupling 16 and into the ball cone clutch 9 via the shaft 2 and the spring sleeve 11. From there, the torque is directed into the ball ramp coupling 7 via the friction connection of the ball cone clutch 9. Since ball cone clutch 9 and ball ramp coupling 7 are matched for retention by friction, a clamping action occurs.

Figure 4:
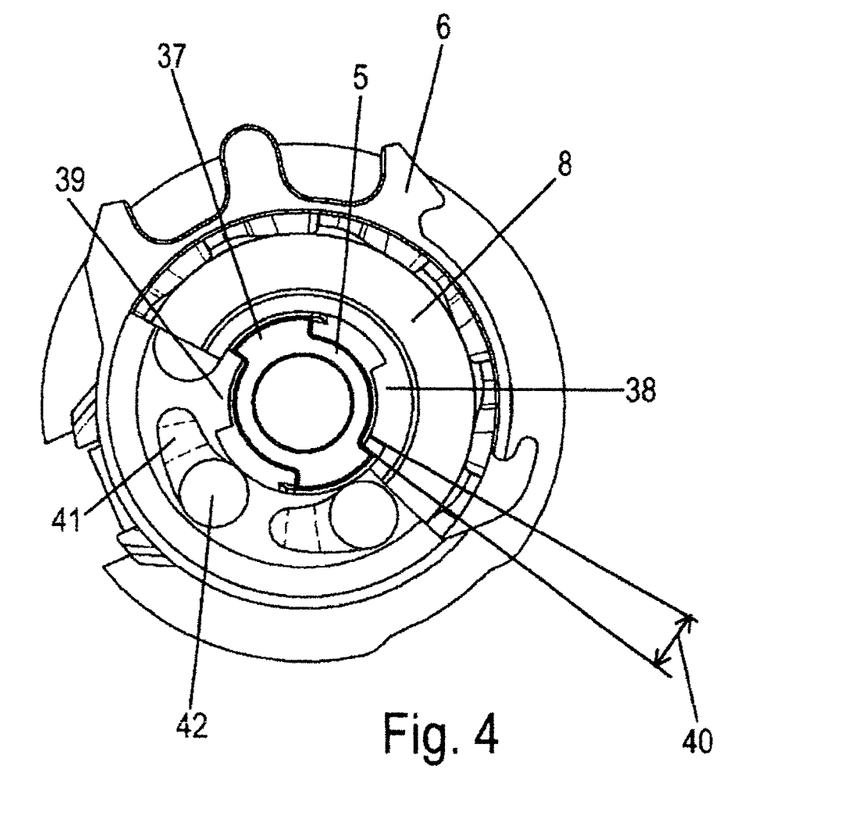
FIG. 4 is a schematic cross-sectional view of the exemplary embodiment in FIG. 1 in the region X.

The clutch ring 8 and the shifting fork or the drive ring 6 each have an inner profiling with the help of which it is possible to prevent the two components from turning back further in the rest position. To this end, FIG. 4 shows a schematic cross-sectional representation of the exemplary embodiment as in FIG. 1 in the region X. The drive ring 6 and the clutch ring 8 support themselves on the collar bush 5 mounted in a rotationally fixed manner, which comprises an outer profile 37 matching a clutch ring inner profile 38 and a drive ring inner profile 39. When the introduced torque exceeds the response moment of the ratchet coupling 16, ratcheting-through of the ratchet coupling 16 occurs. With the stops between the outer profile 37 with the inner profiles 38 and 39 of drive ring 6 and clutch ring 8, it is achieved that on the one hand the clamping action of the freewheel is retained and on the other hand no rotation in the ball ramp coupling 7 occurs. Otherwise, the ratchet coupling 16 would not respond immediately but the ball ramp coupling 7 would initially be rotated on the tracks of the ball ramps 41 until the end position of the ramp balls 42 is reached. (Torque of the ball ramp coupling 7<torque of the ratchet coupling 16).

On positioning the stops of drive ring 6 and clutch ring 8 with the outer profile 37 of the collar bush 5, it must be ensured that the stop for the drive ring 6 (drive ring inner profile 39) becomes effective slightly earlier than the stop of the clutch ring inner profile 38, otherwise the clamping action of the freewheel in the rest position of the adjusting device 1 is not ensured.

This is achieved with a so-called advance of the stop of the drive ring inner profile 39 over the stop of the clutch ring inner profile 38 in each case with the outer profile 37 of the collar bush 5 in that an angular clearance 40 is provided.

As positive restraints of the coupling 16, combinations of different spur toothings are also possible.

The inner and outer profiles 37, 38, 39 can also have other shapes.

| Table of Reference Numerals | |
|---|---|
| 1 | Adjusting device |
| 2 | Shaft |
| 3 | Mounting (bearing) disc |
| 4 | Axial bearing |
| 5 | Collar bush |
| 6 | Drive ring |
| 7 | Ball ramp coupling |
| 8 | Clutch ring |
| 9 | Cone clutch |
| 10 | Cylindrical spring |
| 11 | Spring sleeve |
| 12 | Sleeve cone |
| 13 | Profile disc |
| 14 | Adjusting element |
| 15 | Drive end |
| 16 | Coupling |
| 17 | Cone bush |
| 18 | Coupling disc |
| 19 | Torsion spring |
| 20 | Disc brake |
| 21 | Brake disc |
| 22 | Brake caliper |
| 23 | Brake pads |
| 24 | Crossbeam (bridge) |
| 25 | First adjusting spindle |
| 26 | Second adjusting spindle |
| 27 | Thrust piece |
| 28 | Sprockets |
| 29 | Chain |
| 30 | Eccentric |
| 31 | Rotary lever |
| 32 | Drive element |
| 33 | Pockets |
| 34 | First spur toothing |
| 35 | Second spur toothing |
| 36 | Recess |
| 37 | Outer profile |
| 38 | Clutch ring inner profile |
| 39 | Drive ring inner profile |
| 40 | Angular clearance |
| 41 | Ball ramp |
| 42 | Ramp ball |
| 43 | Cone ball |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wear adjustor for a pneumatic disc brake having a rotary-lever-actuated brake application device, the wear adjustor being insertable in an adjusting spindle of the brake application device and being attachable to a caliper of the disc brake via a mounting disc, the wear adjustor device comprising:
   a drive ring arranged on a drive end of a shaft;
   an axial bearing arranged on an input side of the drive ring;
   a ball ramp coupling with a freewheel function arranged on an output side of the drive ring, wherein the ball ramp coupling comprises the output side of the drive ring, balls and an input side of a clutch ring on an output side of the ball ramp coupling;
   a cone clutch arranged between the ball ramp coupling and a spring sleeve for a cylindrical spring, the cone clutch comprising an output side of the clutch ring and an input side of the spring sleeve; and
   a torque-dependent coupling having a positive restraint operatively configured axially between the clutch ring and the spring sleeve, the positive restraint being configured to rotationally fix the spring sleeve relative to the clutch ring when the clutch ring is axially displaced toward the spring sleeve until a predetermined threshold torque is applied.

2. The adjusting device according to claim 1, wherein the cone clutch is a ball cone clutch having cone clutch balls between the output side of the clutch ring on the drive end and an input side of a cone bush on the input side of the spring sleeve interacting with the torque-dependent coupling.

3. The adjusting device according to claim 2, wherein the torque-dependent coupling comprises a ratchet coupling formed by a portion of the cone bush of the cone clutch and a coupling disc, each of said cone clutch and coupling disc having corresponding toothings; and the coupling disc is connected to the spring sleeve.

4. The adjusting device according to claim 3, wherein the corresponding toothings comprise a first spur toothing arranged on a portion of the cone clutch and a second spur toothing arranged on the coupling disc.

5. The adjusting device according to claim 1, wherein the torque-dependent coupling is operatively configured for a higher transmission moment than that of the ball ramp coupling.

6. The adjusting device according to claim 1, wherein:
   the drive ring comprises a drive ring inner profile;
   the clutch ring on the output side comprises a clutch ring inner profile, said inner profiles interacting with an outer profile of a collar bush axially extending through the ball ramp coupling and the clutch ring on the output side; and
   the collar bush at an end located opposite the outer profile comprises a collar forming a fixed portion of the axial bearing.

7. The adjusting device according to claim 6, further comprising an angular clearance between the outer profile and the inner profiles, the angular clearance allowing for an advance of a stop between the outer profile and the drive ring inner profile over a stop between the outer profile and the clutch ring inner profile.

8. The adjusting device according to claim 7, wherein the other end of the collar bush, which forms the fixed portion of the axial bearing, is fastened in a rotationally fixed manner to the mounting disc attachable to the caliper.

9. The adjusting device according to claim 6, wherein the other end of the collar bush, which forms the fixed portion of the axial bearing, is fastened in a rotationally fixed manner to the mounting disc attachable to the caliper.

10. A pneumatic disc brake, comprising:
   a caliper;
   a rotary-lever-actuated brake application device arranged in the caliper, the brake application device having an adjusting spindle;
   a wear adjuster operatively arranged in the adjusting spindle; and
   wherein the wear adjustor comprises:
      a drive ring arranged on a drive end of a shaft;
      an axial bearing arranged on an input side of the drive ring;
      a ball ramp coupling with a freewheel function arranged on an output side of the drive ring, wherein the ball ramp coupling comprises the output side of the drive ring, balls and the balls arranged on a drive end, and an input side of a clutch ring on an output side of the ball ramp coupling;
      a cone clutch arranged between the clutch ring ball ramp coupling and a spring sleeve for a cylindrical spring, the cone clutch comprising an output side of the clutch ring and an input side of the spring sleeve; and
      a torque-dependent coupling having a positive restraint operatively configured axially between the clutch ring and the spring sleeve, the positive restraint being configured to rotationally fix the spring sleeve relative to the clutch ring when the clutch ring is axially displaced toward the spring sleeve until a predetermined threshold torque is applied.

\* \* \* \* \*